United States Patent [19]

Mutoh

[11] Patent Number: 4,617,568
[45] Date of Patent: Oct. 14, 1986

[54] MTI RADAR

[75] Inventor: Norio Mutoh, Amagasaki, Japan

[73] Assignee: Mitsubishi Denki Kabushiki Kaisha, Tokyo, Japan

[21] Appl. No.: 620,029

[22] Filed: Jun. 13, 1984

[30] Foreign Application Priority Data

Jun. 16, 1983 [JP] Japan .................... 58-109586

[51] Int. Cl.⁴ ............................................. G01S 13/52
[52] U.S. Cl. ..................................................... 342/160
[58] Field of Search ........................................... 343/7.7

[56] References Cited

U.S. PATENT DOCUMENTS 4,122,448 10/1978 Martin .................................. 343/7.7

OTHER PUBLICATIONS

Merrill I. Skolnik Introduction to Radar Systems 2nd edition, pp. 119-121, Fig. 4.21.

Primary Examiner—Thomas H. Tarcza
Assistant Examiner—Donald E. Hayes, Jr.
Attorney, Agent, or Firm—Birch, Stewart, Kolasch & Birch

[57] ABSTRACT

An MTI radar provided with a MTI processor which includes a single erasing circuit for erasing a vector signal due to a stationary target from among all the input vector signal of reflected waves both from a moving and a stationary target; and an arithmetic circuit for removing any other variations than ones from the moving target by calculating the inner product of the post-single-erasing vector signal and a pre-erasing vector signal.

5 Claims, 6 Drawing Figures

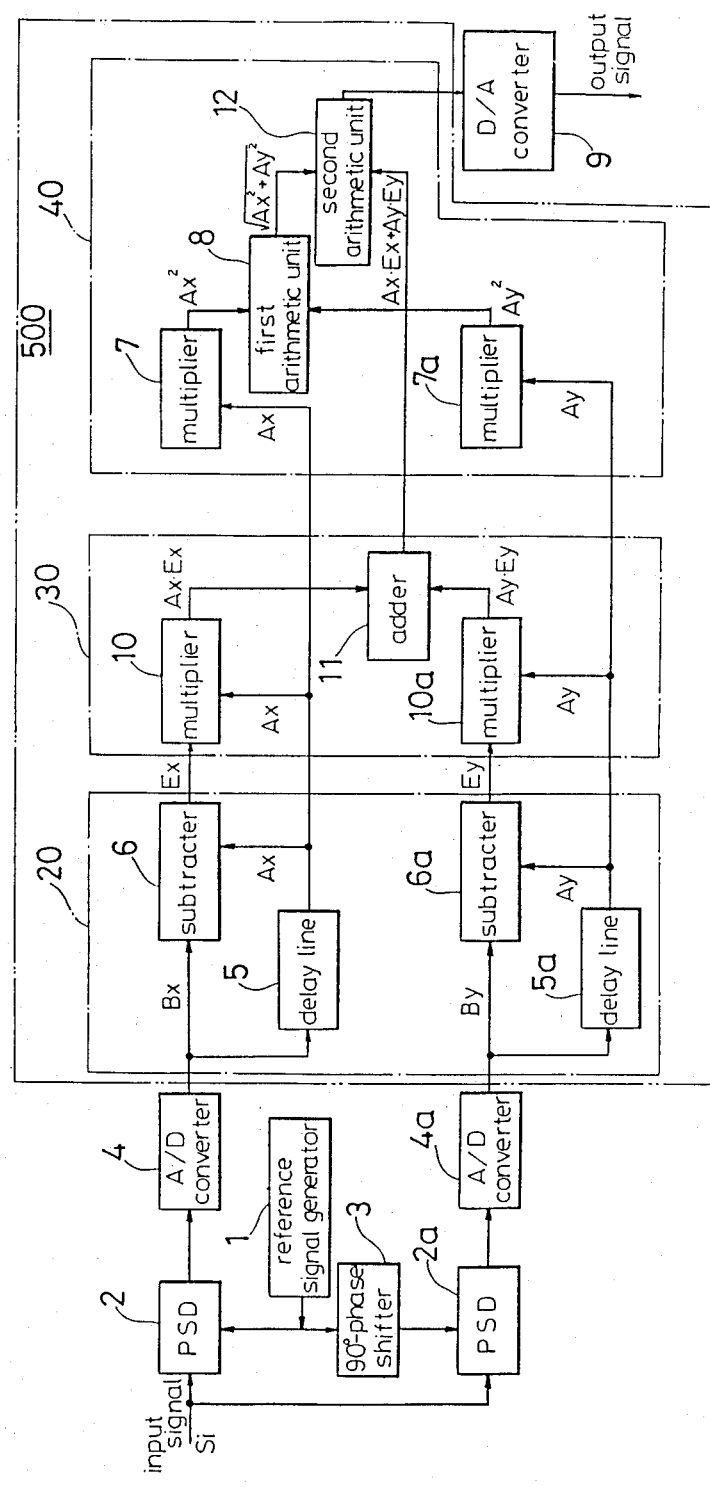
F I G. 6.

MTI RADAR

FIELD OF THE INVENTION

The present invention relates to a moving target indicator (hereinafter referred to as MTI) radar, and more particularly, to an MTI radar having a signal processing system whereby the accurate detection of a moving target is ensured.

BACKGROUND OF THE INVENTION

In general, an MTI radar is provided with a special system whereby reflected waves from a moving target are distinguished from those from a stationary target. Such a special system will be hereinafter referred to as an MTI processor. This processor is designed to detect reflected waves only from a moving target. More concretely, this processor is designed to delay the received signals of reflected waves by one period, and to compare them with the received signals in the next period.

The basic principle of the MTI processor will be described:

Referring to FIG. 1, which shows a vector diagram exemplifying the basic operation of an MTI processor in the MTI radar, the received signal from a stationary target, that is, clutter is represented by a vector $\vec{C}$, and that from a moving target is represented by a vector $\vec{Ma}$. When the stationary and the moving target are simultaneously input to the radar receiver, the first received signal becomes equal to the vector sum of the vectors $\vec{C}$ and $\vec{Ma}$, which is represented by a vector $\vec{A}$. When the period shifts to the next and comes into the second reception, a signal from the moving target changes into $\vec{Mb}$, and therefore, the received signal is represented by a vector $\vec{B}$. In the MTI processors the common practice is to delay a received signal $\vec{A}$ by one period of repetition of radar transmission, and subtract it from the second received signal $\vec{B}$. At this time each received signal contains the components of the moving target, and therefore, each vector is liable to variation. As a result, a vector difference $\vec{M}$ is obtained, which is detected as the moving target. If all received signals are from stationary targets, they are signals without any variation superimposed thereon, thereby causing them to be completely erased, and keeping the output at zero.

Reference will be made to FIG. 2, which shows a block diagram of an MTI radar known in the art, which employs the MTI processor described above:

The illustrated circuit is designed to obtain a vector difference between the received signals, wherein the processing is conducted twice under a double erasing structure. The operation of the processor will be described in detail:

The output of a reference signal generator 1 is divided into two; one is kept in the same phase as the output of the generator 1 per se, which is input to the phase sensitive detector (PSD) 2, and the other is phase-shifted by 90° by a 90°-phase shifter 3, which is input to a phase sensitive detector 2a, where the received signal is phasically detected by comparison with the reference signal right-angularly displaced therefrom. This means that the input signal Si is divided into two orthogonal components by the two phase sensitive detectors 2 and 2a. The output of the phase sensitive detector 2 is an X-axis component, commonly called I channel component. Likewise, the output of the phase sensitive detecter 2a is a Y-axis component, commonly called Q channel component. By using these components the vector arithmetic operation is conducted.

The analog outputs of the phase sensitive detecters 2 and 2a are digitized by A/D converters 4 and 4a. In this way they are decomposed into X- and Y-axis components. The first received signal after digitization is delayed by one period through delay lines 5 and 5a, and when the second received signal is input, arithmetic operation is performed so as to obtain a vector difference by the subtracters 6 and 6a. The outputs of the subtracters 6 and 6a are subjected to the second arithmetic operation by delay lines 5b, 5c and subtracters 6b, 6c so as to obtain a further vector difference. The outputs X and Y of the subtracters 6b and 6c are respectively input to multipliers 7 and 7a, thereby obtaining $X^2$ and $Y^2$. Then the sum of $X^2$ and $Y^2$ is operated by means of an arithmetic unit 8, thereby determining the amplitude of the vector of a remainder after the double erasing. The output obtained through the MTI processing is converted into analog by an D/A converter 9, and is output to the outside.

FIG. 3 shows a vector diagram exemplifying the operation of the double erasing. An output after the double erasing is obtained as a difference between the output $\vec{M_1}$ and $\vec{M_2}$ after the single erasing, and it becomes as the following:

$$\vec{M_3} = (\vec{M_2} - \vec{M_1})/2$$

The output after the single erasing, indicated by $|\vec{M_1}|$, is well known as MTI filtering characteristic. It takes a sin waveform, which is expressed by the following formula:

$$|\vec{M_1}| \alpha |\sin \pi Tfd| \ldots \quad (1)$$

wherein
T: period of repetition of radar transmission;
fd: Doppler frequency

The output after the double erasing: $|\vec{M_3}|$ is expressed by the following formula:

$$|\vec{M_3}| \alpha |\sin \pi Tfd|^2 \ldots \quad (2)$$

It must be noted that the characteristic expressed by the formula (2) is only applicable to rotating vector signals as represented by a vector signal of a moving target, and accordingly that a larger portion of a signal caused by the moving target will be erased as the erasing becomes multiple. To the contrary, other variations than those due to the moving target will not become rotating vectors, but become straight vectors as shown in FIG. 4. Accordingly, erasing effect does not increase through the multiple erasing with respect to these variations, and a large portion of them remain unerased.

FIG. 4 shows one of the examples mentioned above. The vector $\vec{A}$ is a first received signal, the vector $\vec{B}$ is a second received signal, and the vector $\vec{D}$ is a third received signal, wherein the vectors $\vec{A}$ and $\vec{D}$ are equal. Such a signal $\vec{D}$ does not occur in cases of moving target, but it is likely to arise in a case that the variation is caused by a ripple at a power source. In this case the output obtained through the double erasing becomes a signal $|\sin \pi Tfd|$ of the same amplitude as the output after the single erasing, which means that the double erasing had completely no effect.

The prior art MTI radar is constructed in the aforementioned manner, and consequently, if the signal undergoes any change, a larger portion of the signal caused by the moving target is erased than those caused by variations. To prevent this, it is essential that a received signal from a stationary target undergoes no change or variations. In order to achieve this the transmitting signal must be stable. To this end the radar system is free from any impurities, such as ripples at the power source, which are types likely to cause change or variations in the transmitting signals. This naturally leads to an increased size of the system, and complicated circuitry.

OBJECTS AND SUMMARY OF THE INVENTION

The present invention is directed to solve the problems and difficulties mentioned above with respect to the prior art MTI radar, and has for its object to provide an improved MTI radar in which remainders caused by variations are reduced without those caused by moving targets being erased.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

Briefly stated, the present invention utilizes the fact that signals caused by variations which are likely to occur in transmitting signals except for those from the moving target can be removed by obtaining the inner product of the post-single-erasing vector signal and the pre-erasing vector signal because the angle formed by the post-single-erasing vector signal and the pre-erasing vector signal becomes nearly 90°, which means that the inner product of these vector signals becomes approximately zero.

In order to achieve the objects mentioned above, according to the present invention there is provided an MTI radar provided with a MTI processor which comprises:

a single erasing circuit for erasing a vector signal from a stationary target among all the input vector signals including reflected waves both from a moving and a stationary target; and an arithmetic circuit for removing any other variations than ones from the moving target by calculating the inner product of the post-single-erasing vector signal and the pre-erasing vector signal.

BRIEF DESCRIPTION OF THE INVENTION

FIG. 6 is a block diagram of an MTI radar embodying the present invention.

DETAILED DESCRIPTION OF THE INVENTION

The main cause for affecting the transmitting signals is a ripple at the power source of high voltage which is impressed on the transmitter. The source ripple is likely to affect both the level and the phase of the transmitting signal, but the resulting level variation is smaller than the resulting phase variation, and normally it can be safely neglected. Accordingly, it will be understood that the components remaining unerased through the MTI processing consist almost of the transmitting signals which have undergone a phase variation. An example is shown in FIG. 5.

Figure 1:
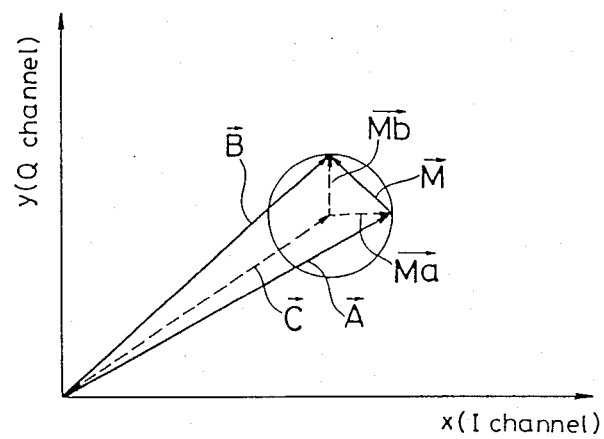
FIG. 1 is a vector diagram exemplifying the basic principle of an MTI processor known in the art.
Figure 3:
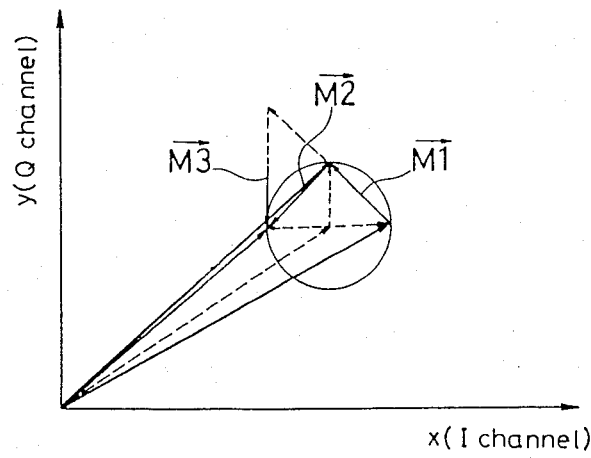
FIG. 3 is a vector diagram exemplifying the operation of the MTI processor shown in FIG. 2.
Figure 2:
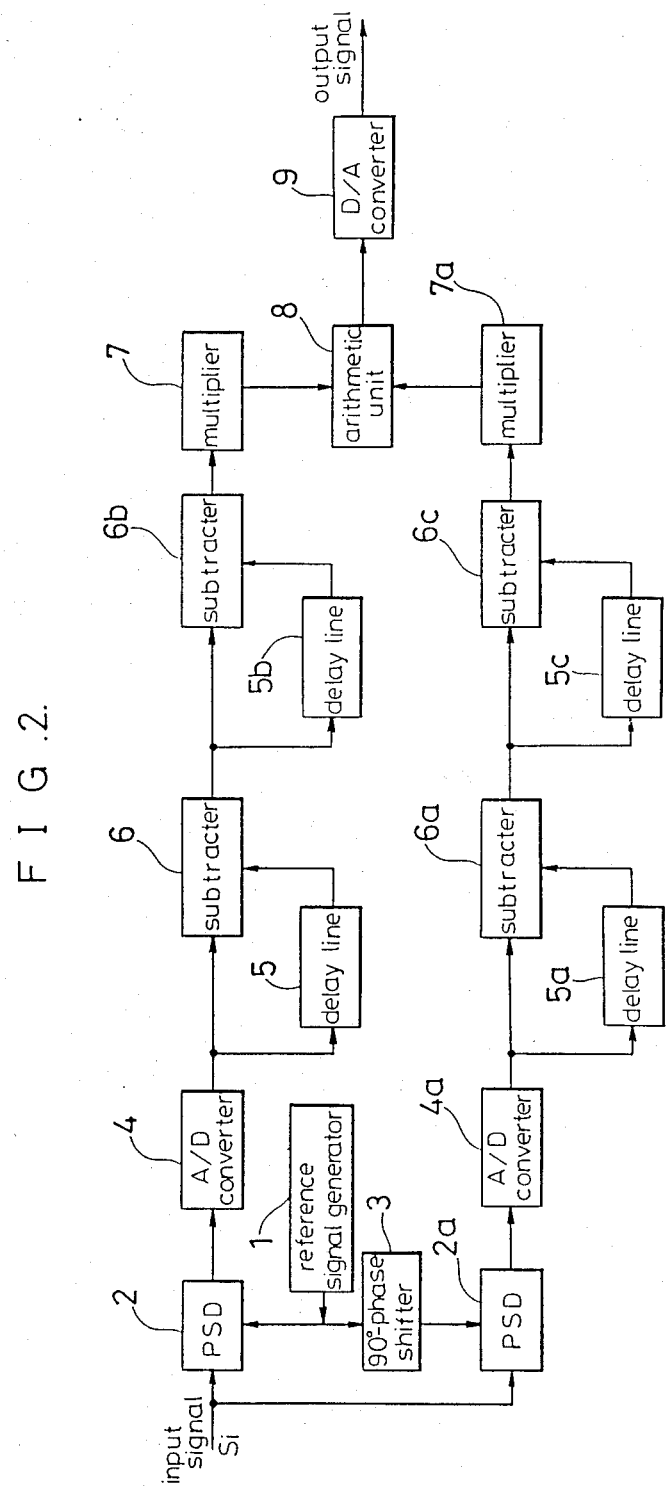
FIG. 2 is a block diagram of an MTI radar incorporating a conventional MTI processor.
Figure 4:
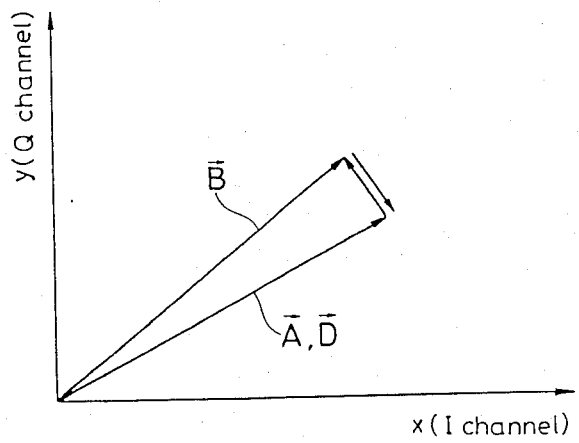
FIG. 4 is a vector diagram exemplifying the operation of one example of the MTI processors shown in FIG. 2.
Figure 5:
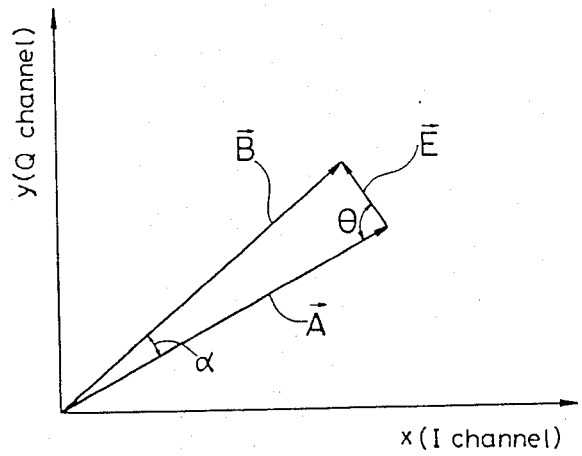
FIG. 5 is a vector diagram exemplifying the basic principle of the present invention.

In FIG. 5 the vector $\vec{A}$ is a first received signal, and the vector B is a second received signal, and it is shown that a phase variation α was caused therebetween. In this case, if the single erasing is conducted through a single erasing circuit so as to obtain the difference between the vectors $\vec{A}$ and $\vec{B}$, the vector $\vec{E}$ will be output as a remainder. However, if such a remainder is obtained with respect to the stationary target, the moving target input simultaneously with the stationary target will not be detected if it is smaller than the vector $\vec{E}$. This is due to the fact that the conventional MTI processor extracts the amplitude of the vector remainder alone.

Therefore, in the present invention, an angle formed by the pre-erasing vector $\vec{A}$ (or the vector $\vec{B}$) and the post-erasing vector $\vec{E}$ is noted, and the inner product of the post-single-erasing vector signal and the pre-erasing vector signal is obtained as an output, thereby ensuring that any variations caused by other factors than the moving target are removed.

In other words, an angular displacement between the vector $\vec{A}$ and the vector $\vec{E}$ only due to the phase variations of the transmitting signals or the fluctuation of the targets is small such that the angle $\theta$ therebetween becomes nearly 90°. Therefore, the inner product of the vectors $\vec{A}$ and $\vec{E}$ becomes zero, which is expressed by the following formula:

$$\vec{A}\cdot\vec{E} = Ax\cdot Ex + Ay\cdot Ey = |\vec{A}|\cdot|\vec{E}|\cos\theta\ldots \quad (3)$$

wherein $\theta \doteq 90°$
Therefore, $\vec{A}\cdot\vec{E} \doteq 0$

From this it is evident that the phase variation in the transmitting signal can be removed.

In the formula (3) the Ax, Ay, Ex, and Ey are respectively X-axis, Y-axis components of the two vectors, respectively, and $\vec{A}\cdot\vec{E}$ is the inner product of the two vectors. When the $\vec{E}$ contains a moving target component, the amplitude of this output depends upon the amplitude of a received signal from the stationary target ($|\vec{A}|$) because it contains a coefficient of the $|\vec{A}|$. In this case the $|\vec{A}|\cdot|\vec{E}|\cos\theta$ is, of course, not zero. The formula (3) is normalized by the $|\vec{A}|$ into the formula (4):

$$\vec{A}\cdot\vec{E}/|\vec{A}| = (Ax\cdot Ex + Ay\cdot Ey)/|\vec{A}| = |\vec{E}|\cos\theta\ldots \quad (4)$$

wherein the $|\vec{E}|$ is an output from the conventional single erasing circuit.

It will be understood from this formula that the present invention is designed to obtain an output of the moving target by multiplying the output from the conventional single erasing circuit by $\cos\theta$. The $|\vec{E}|$ can be expressed by a sine function as shown in the formula (1), and when the outputs from the conventional double erasing circuit and the output from the circuit of the invention are compared with the use of the sin function, the following formula is established, from which the difference therebetween will become evident:

The output from the double erasing circuit:

$$|\sin \pi Tfd| \times |\sin \pi Tfd| \ldots \quad (5)$$

The output from the circuit of the invention:

$$|\sin \pi Tfd \times \cos \theta| \ldots \quad (6)$$

The formula (5) is one which is concerned with the moving target, in which it will be noted that the erasing effect against the moving target is great, contrary to that against the variation-caused component being small. In the formula (6), when variations free from the moving target are exclusively considered, the $\cos \theta$ is equal to $|\sin \pi Tfd|$. This produces the effect of the double erasing shown in the formula (2), thereby resulting in an increased erasing effect against the variation-caused component. In general, when the moving target component is contained, $\cos \theta$ will be unequal to $|\sin \pi Tfd|$.

FIG. 6 is a block diagram of an example of an MTI radars embodying the present invention, in which a circuit for obtaining the inner product of the vectors, and a normalizing circuit are inserted subsequent to the single erasing circuit 20. The transmitter is omitted for simplicity.

As shown in FIG. 6, when reflected waves from the moving target as well as the stationary target are received, an input signal Si is input to phase sensitive detecters 2 and 2a. The input signal Si input thereto is phasically detected by the reference signal from the reference signal generator 1, and by a signal phasically shifted by 90° by a phase shifter 3, respectively, thereby decomposed into two components, which are orthogonal with each other. The phasically detected signals are digitized into digital signals by A/D converters 4 and 4a, and input to the MTI processor 500, which includes the single erasing circuit 20, a first arithmetic circuit 30, and a second arithmetic circuit 40. The single erasing circuit 20 includes subtracters 6, 6a and delay lines 5, 5a. In the single erasing circuit 20, first received signals Ax and Ay are delayed by one period by the delay lines 5, 5a, and when second received signals Bx and By are input, arithmetic operation is conducted by the subtracters 6 and 6a so as to obtain a vector differences Ex and Ey. The subtracters 6 and 6a output the vector differences Ex and Ey, respectively. The first arithmetic circuit 30 includes multipliers 10, 10a, and an adder 11. The multipliers 10 and 10a are to multiply the first received signals Ax and Ay by the vector differences Ex and Ey, respectively. In this way the values of the [Ax×Ex] and [Ay×By] in the formula (3) are obtained. The adder 11 is to add the output obtained by the multipliers 10 and 10a, and the output thereof becomes the inner product of the vectors, that is, (Ax·Ex+Ay·Ey). Herein, the Ax, Ay are X-axis, Y-axis components of the pre-erasing vector signal $\vec{A}$, and the Ex, Ey are X-axis, Y-axis components of the post-erasing vector signal $\vec{E}$.

The second arithmetic circuit 40 includes multipliers 7, 7a, a first arithmetic unit 8, and a second arithmetic unit 12. The multipliers 7 and 7a are designed to calculate (Ax×Ax) and (Ay×Ay), respectively. The first arithmetic unit 8 is delivered with the outputs Ax$^2$, and Ay$^2$ obtained by the multipliers 7 and 7a, and calculates $\sqrt{Ax^2+Ay^2}$, so as to obtain the absolute value $|\vec{A}|$ of the input signal vector A. The second arithmetic unit 12 is a circuit, which is designed to calculate (Ax·Ex+Ay·Ey)/$\sqrt{Ax^2+Ay^2}$ in the formula (4), wherein the vector inner product: (Ax·Ex+Ay·Ey) is calculated by the first arithmetic circuit 30, and wherein the $\sqrt{Ax^2+Ay^2}$ is calculated by the first arithmetic unit 8. Accordingly, the second arithmetic circuit 40 outputs the result of the calculation of the (Ax·Ex+Ay·Ey)/$\sqrt{Ax^2+Ay^2}$. The output of the second arithmetic circuit 40, that is, the output of the MTI processor 500, is converted into analog by the D/A converter 9, whose output signal becomes an input signal to a radar indicator which is not shown here.

As evident from the foregoing, according to the present invention the MTI radar is provided with an MTI processor, which is designed to obtain the inner product of the post-single-erasing vector signal, and the pre-erasing vector signal. The provision of this processor has ensured that a moving target is detected at high accuracy by removing components remaining unerased due to variations occurring on the transmitting signal or the fluctuation of the target or any other causes.

What is claimed is:

1. An MTI radar provided with a MTI processor which comprises:
   a single erasing means for erasing a vector signal received from a stationary target among a plurality of pre-erasing vector signals that include reflected waves received both from a moving and a stationary target producing a post-single erasing vector signal; and
   arithmetic means for removing any other variations than variations from the moving target by calculating the inner product of the post-single-erasing vector signal and one of the pre-erasing vector signals.

2. The MTI radar as defined in claim 1, further comprising a means for decomposing said input vector signals into orthogonal components, and inputting same to the MTI processor.

3. The MTI radar as defined in claim 2, wherein said arithmetic means comprises a first arithmetic circuit for calculating the inner product of the vector signals, and a second arithmetic circuit for normalizing the inner product by the amplitude of the pre-erasing vector signal.

4. An MTI radar as defined in claim 3, wherein said first arithmetic circuit comprises a pair of multipliers whereby each of the orthogonal components of the post-single-erasing vector signal is multiplied by each of those in the pre-erasing state, and an adder for adding the outputs from the pair of multipliers.

5. An MTI radar as defined in claim 3, wherein said second arithmetic circuit comprises first multipliers whereby each of the orthogonal components in the pre-erasing state is multiplied by itself, first arithmetic unit which adds the outputs of said first multipliers and calculates the square root of the added value, and a second arithmetic unit whereby the output of the first arithmetic circuit is divided by the output of the first arithmetic unit.

* * * * *